United States Patent
Satoh

(10) Patent No.: US 9,576,361 B2
(45) Date of Patent: Feb. 21, 2017

(54) IMAGE PROCESSING APPARATUS AND IMAGE PROCESSING METHOD

(71) Applicant: CANON KABUSHIKI KAISHA, Tokyo (JP)

(72) Inventor: Kiyohide Satoh, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/736,556

(22) Filed: Jun. 11, 2015

(65) Prior Publication Data
US 2015/0363907 A1    Dec. 17, 2015

(30) Foreign Application Priority Data
Jun. 16, 2014    (JP) .................... 2014-123815

(51) Int. Cl.
- *G06K 9/36*    (2006.01)
- *G06K 9/20*    (2006.01)
- *G06T 7/00*    (2006.01)

(52) U.S. Cl.
CPC ... *G06T 7/0024* (2013.01); *G06T 2207/30068* (2013.01)

(58) Field of Classification Search
CPC ............... G06T 2207/30068; G06T 7/0024
See application file for complete search history.

(56) References Cited

U.S. PATENT DOCUMENTS

| | | | |
|---|---|---|---|
| 2005/0004451 A1* | 1/2005 | Vilsmeier | A61B 90/36 600/426 |
| 2013/0182901 A1 | 7/2013 | Ishida et al. | |
| 2014/0193099 A1* | 7/2014 | Yoshikawa | A61B 8/5246 382/295 |

FOREIGN PATENT DOCUMENTS

JP    2013198722 A    10/2013

* cited by examiner

*Primary Examiner* — Phuoc Tran
(74) *Attorney, Agent, or Firm* — Rossi, Kimms & McDowell LLP

(57) ABSTRACT

An image processing apparatus comprises a first estimation unit configured to estimate a deformation between a first image and a second image under a first condition and obtain first deformation information; a second estimation unit configured to estimate a deformation between the first image and the second image under a second condition different from the first condition and obtain second deformation information; and an obtaining unit configured to obtain one of an estimation error and reliability of the deformation at a point on an image based on a difference between the first deformation information and the second deformation information.

20 Claims, 3 Drawing Sheets

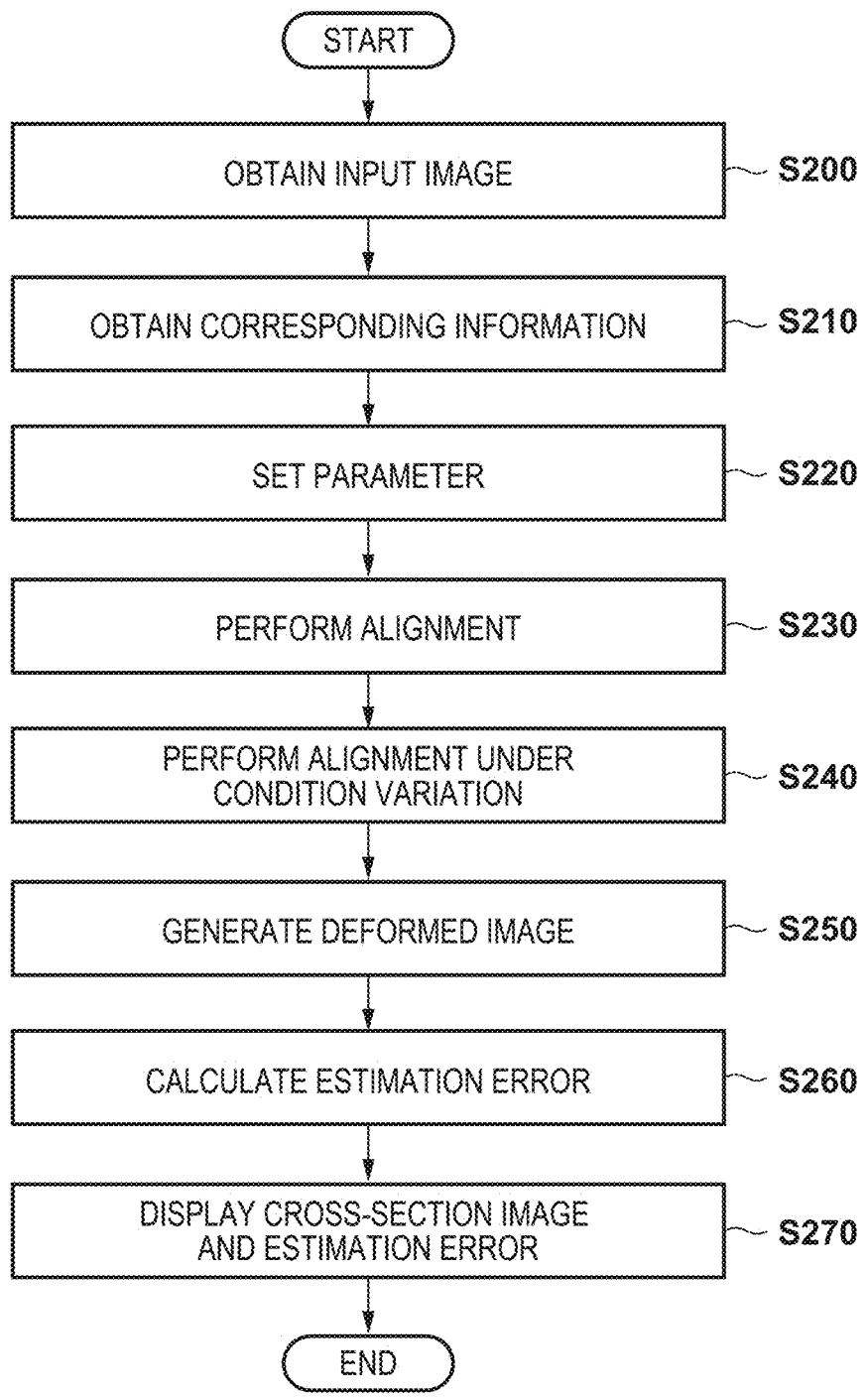

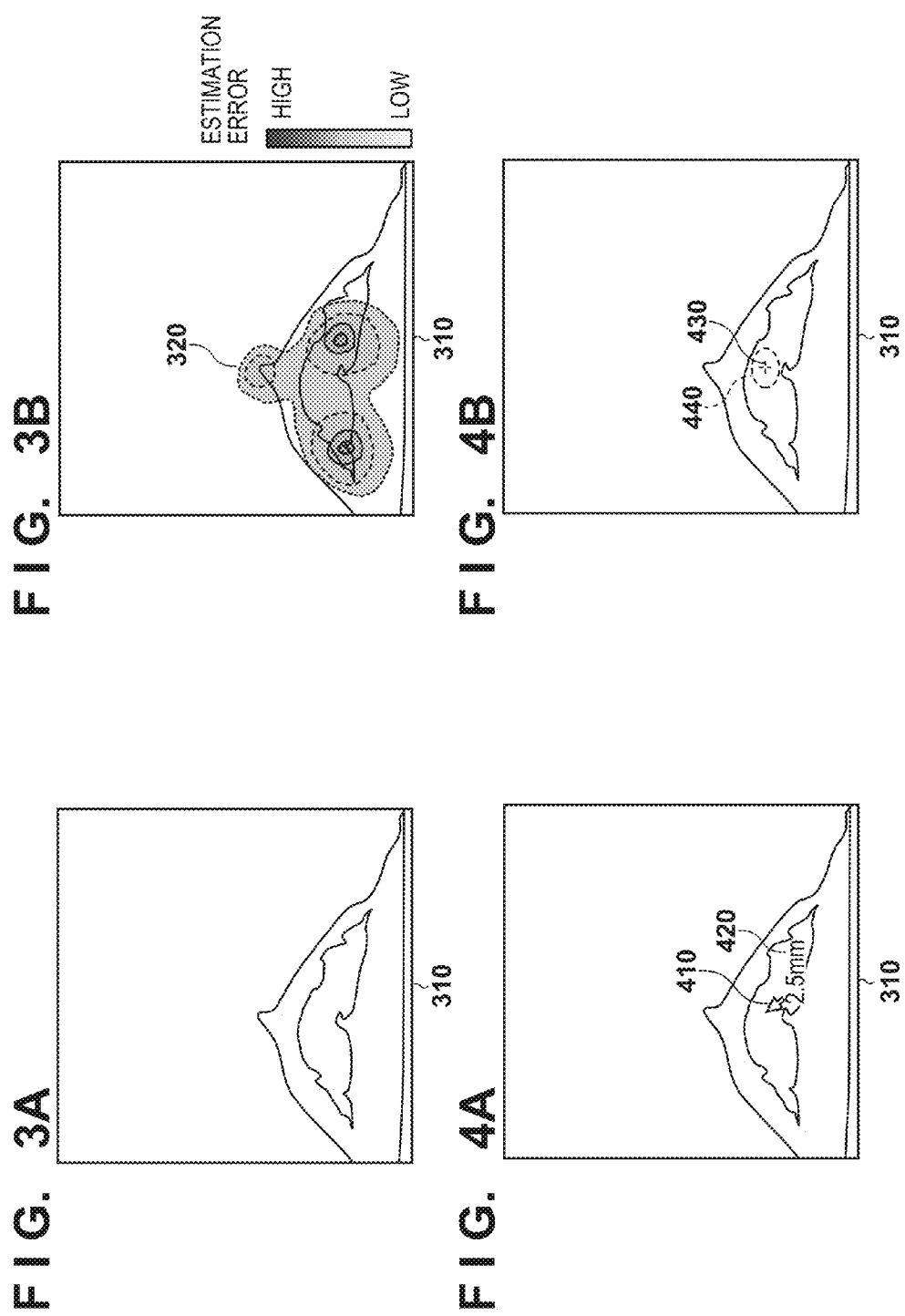

IMAGE PROCESSING APPARATUS AND IMAGE PROCESSING METHOD

BACKGROUND OF THE INVENTION

Field of the Invention

The present invention relates to an image processing apparatus and an image processing method.

Description of the Related Art

In imaging diagnosis using a medical image (three-dimensional tomographic image representing information about the inside of an object), a doctor performs diagnosis while comparing images captured by a plurality of imaging apparatuses (modalities) in different body postures at different times with imaging parameters, and the like. Since postures and shapes of an object differ between images, identification of a lesion area and comparison are difficult. Thus, alignment between a plurality of images is attempted. Conversion and deformation of the posture can be performed on one image to generate an image coincident with the other image.

However, the result of general alignment contains an error and is not always accurate. The doctor therefore cannot determine how reliable the alignment result is.

As a method of estimating an alignment error, Japanese Patent Laid-Open No. 2013-198722 discloses a method based on the instability (ambiguity of the solution) of a deformation parameter estimated as the result of deformation alignment. Based on the variation range of the estimated position of a point corresponding to a point of interest upon intentionally varying an unstable parameter, the method in Japanese Patent Laid-Open No. 2013-198722 estimates the error of the estimated position.

However, the error estimation method described in Japanese Patent Laid-Open No. 2013-198722 cannot consider a factor other than the instability of the estimated parameter.

The present invention provides a technique for providing a method of obtaining an estimation error or reliability in alignment (especially alignment arising from interpolation) between a plurality of images.

SUMMARY OF THE INVENTION

According to one aspect of the present invention, there is provided an image processing apparatus comprising: a first estimation unit configured to estimate a deformation between a first image and a second image under a first condition and obtain first deformation information; a second estimation unit configured to estimate a deformation between the first image and the second image under a second condition different from the first condition and obtain second deformation information; and an obtaining unit configured to obtain one of an estimation error and reliability of the deformation at a point on an image based on a difference between the first deformation information and the second deformation information.

According to one aspect of the present invention, there is provided an image processing apparatus comprising: an information obtaining unit configured to obtain deformation information of an image; an image generation unit configured to generate a deformed image by performing coordinate transformation on the image based on the deformation information; an obtaining unit configured to obtain one of an estimation error and reliability of a deformation on the deformed image; and a display control unit configured to display the deformed image and information representing one of the estimation error and reliability in association with each other.

According to one aspect of the present invention, there is provided an image processing method comprising the steps of: estimating a deformation between a first image and a second image under a first condition to obtain first deformation information; estimating a deformation between the first image and the second image under a second condition different from the first condition to obtain second deformation information; and obtaining one of an estimation error and reliability of the deformation at a point on an image based on a difference between the first deformation information and the second deformation information.

According to one aspect of the present invention, there is provided an image processing method comprising the steps of: obtaining deformation information of an image; generating a deformed image by performing coordinate transformation on the image based on the deformation information; obtaining one of an estimation error and reliability of a deformation on the deformed image; and displaying the deformed image and information representing one of the estimation error and reliability in association with each other.

Further features of the present invention will become apparent from the following description of exemplary embodiments (with reference to the attached drawings).

BRIEF DESCRIPTION OF THE DRAWINGS

FIG. 2 is a flowchart showing the processing procedures of the image processing apparatus according to the first embodiment;

FIGS. 3A and 3B are schematic views showing an example of an estimation error display according to the first embodiment; and FIGS. 4A and 4B are schematic views showing an example of an estimation error display according to the second embodiment.

DESCRIPTION OF THE EMBODIMENTS

Figure 1:
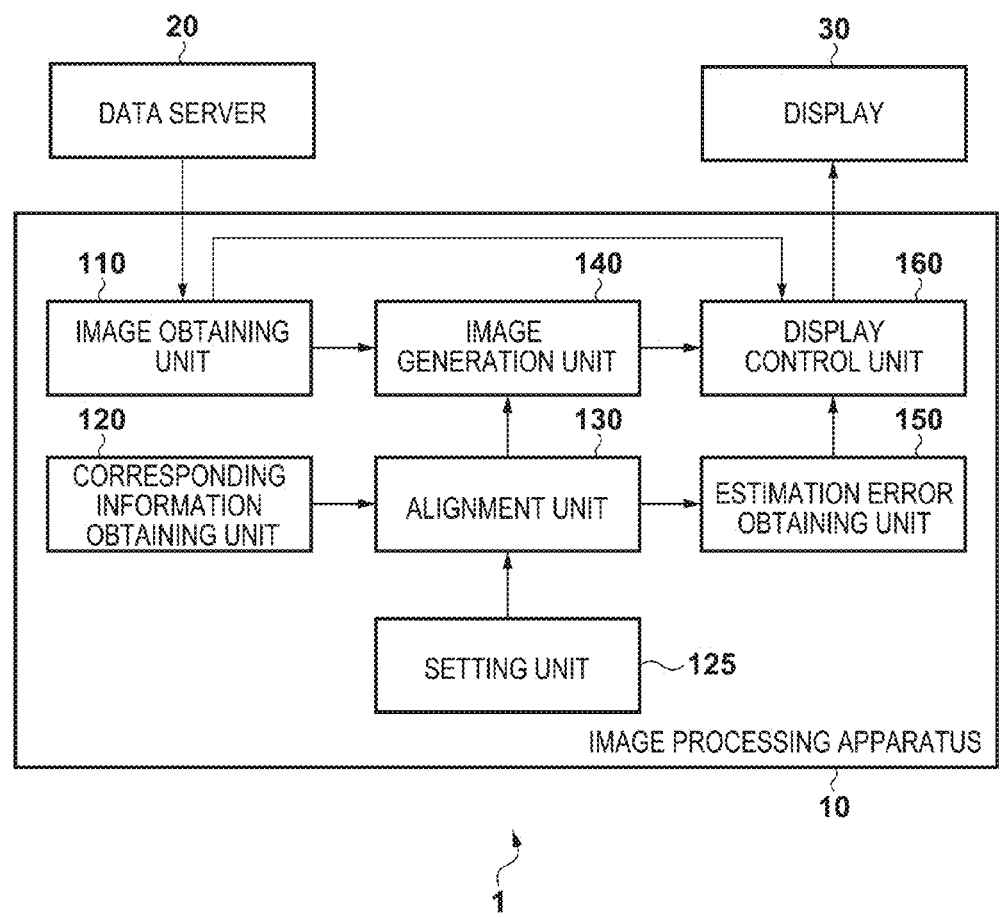
FIG. 1 is a block diagram showing the functional arrangement of an image processing system and image processing apparatus according to the first embodiment.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

An image processing apparatus according to the first embodiment is an apparatus that performs deformation alignment between a plurality of three-dimensional tomographic images. The image processing apparatus generates a deformed image by deforming one three-dimensional tomographic image so that its position and shape coincide with those of the other three-dimensional tomographic image. At this time, the estimation error or reliability of alignment at each position of the generated deformed image is obtained, and its distribution is displayed in association with the deformed image. This is the first feature. The image processing apparatus according to this embodiment will be explained below.

<1. Arrangement of Image Processing System 1>

FIG. 1 shows the arrangement of an image processing system 1 according to this embodiment. As shown in FIG. 1, the image processing system 1 according to this embodiment includes an image processing apparatus 10, a data server 20, and a display 30. The image processing apparatus 10 includes an image obtaining unit 110, a corresponding information obtaining unit 120, a setting unit 125, an alignment unit 130, an image generation unit 140, an estimation error obtaining unit 150, and a display control unit 160.

The image obtaining unit 110 obtains, from the data server 20, a plurality of three-dimensional tomographic images (that is, first and second images) of an object serving as an alignment target.

The corresponding information obtaining unit 120 obtains pieces of corresponding information in the image coordinate systems of the respective first and second images.

The setting unit 125 sets a condition (first condition) when executing alignment processing (deformation estimation processing). Details of the condition setting will be described later. Based on the first condition, the setting unit 125 sets a second condition different from the first condition.

Based on the pieces of corresponding information obtained by the corresponding information obtaining unit 120, the alignment unit 130 executes alignment processing (deformation estimation processing) between the first image and the second image under the condition set by the setting unit 125.

Based on the alignment result obtained by the alignment unit 130, the image generation unit 140 generates a new image (deformed image) by performing coordinate transformation on the first image so that the first image coincides with the second image.

Based on an alignment result obtained under the first condition set by the setting unit 125 and an alignment result obtained under the second condition, the estimation error obtaining unit 150 calculates the estimation error or reliability of alignment at each point on the deformed image obtained by the image generation unit 140, and generates an estimation error image representing the distribution.

The display control unit 160 performs control to display, on the display 30, the cross-section image of the second image, and a corresponding cross-section image of the deformed image generated by the image generation unit 140.

The data server 20 holds a plurality of three-dimensional tomographic images of an object serving as an alignment target. Note that each three-dimensional tomographic image includes, as pieces of supplementary information, the image size, resolution, modality type, imaging information (for example, imaged portion and body posture), and case information (for example, patient information, organ region information, and region-of-interest information). If necessary, these pieces of supplementary information are transmitted to the image processing apparatus 10 together with images.

<2. Processing to Be Executed by Image Processing Apparatus 10>

Next, the procedures of processing to be executed by the image processing apparatus 10 according to this embodiment will be explained with reference to the flowchart of FIG. 2. The following explanation will exemplify a case in which the first and second images captured in different postures of the same object are loaded as a plurality of three-dimensional tomographic images from the data server 20, and deformation processing is performed on the first image to generate a deformed image by deforming the first image so that its position and shape coincide with those of the second image.

(Step S200; Obtainment of Input Image)

In step S200, the image obtaining unit 110 obtains, from the data server 20, a plurality of three-dimensional tomographic images (that is, the first and second images) of an object serving as an alignment target. The image obtaining unit 110 transmits the obtained images to the image generation unit 140 and the display control unit 160.

(Step S210; Obtainment of Corresponding Information)

In step S210, the corresponding information obtaining unit 120 obtains pieces of corresponding information in the image coordinate systems of the respective first and second images. The corresponding information obtaining unit 120 transmits the obtained pieces of corresponding information to the alignment unit 130. The corresponding information is information of a corresponding point, line, or plane between two images. The obtainment of pieces of corresponding information is executed by, for example, inputting, to the image processing apparatus 10, a corresponding point between images that is visually identified by a user. More specifically, while the user compares the cross-section images of the respective three-dimensional tomographic images displayed on the display 30, he inputs positions regarded as anatomically the same position on the respective images as corresponding points by clicking of a mouse (not shown) or the like, thereby obtaining pieces of corresponding information.

(Step S220; Setting of Parameter)

In step S220, the setting unit 125 sets a condition (first condition) when executing alignment processing (deformation estimation processing) (obtains a user's choice), and transmits it to the alignment unit 130. The first condition includes the type of a deformation description model used when estimating a deformation, and the detailed settings of the deformation description model. For example, user's selections regarding the following conditions are obtained:

Selection of a deformation description model (for example, selection of which of FFD (Free-Form Deformation) and a radial basis function is used)

Selection of the grid size of a control point when FFD is used (for example, selection from 5 mm, 10 mm, 15 mm, and 20 mm)

Selection of the shape of the radial basis function when the radial basis function is used (for example, selection from the TPS (Thin Plate Spline) function, Gauss function, Wendland function, and cubic function)

Presence/absence of various regularization terms (terms for evaluating conservation of the volume, maintenance of smoothness, and the like) and setting of the weight in a cost function used in optimization calculation of the deformation Note that the user need not always set all conditions. Only some conditions may be settable by the user, and default values may be set for the remaining conditions. Needless to say, the above conditions are merely examples, and conditions other than those mentioned above may be desirably settable in accordance with a deformation description model or alignment method to be employed.

(Step S230; Alignment)

In step S230, based on the pieces of corresponding information obtained in step S210, the alignment unit 130 executes alignment processing (deformation estimation processing) between the first image and the second image under the condition set in step S220. More specifically, the alignment unit 130 estimates deformation information (first deformation information) (deformation parameter under the condition) that minimizes the residual (or a cost function including the residual) of the corresponding point position between the first image and the second image when the first image is deformed under the set condition. The alignment unit 130 transmits the obtained estimation result (to be referred to as the first alignment result hereinafter) to the image generation unit 140 and the estimation error obtaining unit 150. In the following description, deformation information estimated in this step will be referred to as a mapping function $\phi(p)$ of a coordinate point p of the first image to the second image.

(Step S240; Alignment under Condition Variation)

In step S240, based on the first condition set in step S220, the setting unit 125 sets one or more (N) conditions (second conditions) different from the first condition. Under each newly set condition, the alignment unit 130 executes alignment processing between the first image and the second image based on the pieces of corresponding information obtained in step S210. Processing after setting each condition is the same as step S230. The alignment unit 130 transmits, to the estimation error obtaining unit 150, pieces of deformation information (pieces of second deformation information) (to be referred to as second alignment results hereinafter) as a plurality of obtained estimation results. In the following description, the ith deformation information estimated in this step will be referred to as a mapping function $\phi(p)$ of the coordinate point p of the first image to the second image.

The setting of the second condition is performed by fixing the first condition set in step S220 except for some conditions, and varying the values of the unfixed conditions (variation conditions). That is, the second condition is set by changing at least part of the first condition. At this time, the variation condition can be defined in accordance with the first condition. For example, the variation condition is decided in accordance with a deformation description model set as the first condition. For example, some of the detailed settings of each deformation description model are decided as variation conditions in accordance with the deformation description model of the first condition.

More specifically, when FFD is set as the deformation description model in the first condition, for example, the grid size of the control point is set as the variation condition. At this time, for example, when the grid size of the control point is set to be 5 mm in the first condition, respective conditions when the grid size of FFD is changed to values other than 5 mm, that is, 10 mm, 15 mm, and 20 mm are decided as the second conditions.

When the radial basis function is set as the deformation description model in the first condition, the shape of the radial basis function is set as the variation condition. At this time, for example, when the TPS function is set as the radial basis function in the first condition, respective conditions when the radial basis function is changed to functions other than the TPS function, that is, the Gauss function, Wendland function, and cubic function are decided as the second conditions.

Alternatively, the variation condition may be decided in addition to the setting of validation/invalidation of each regularization processing in the first condition. For example, as for regularization processing set to be valid in the first condition, respective conditions when the weight of a target regularization term is changed to various values other than a set value can be decided as the second conditions. Note that the user may designate a variation condition via the setting unit 125.

(Step S250; Obtainment of Deformed Image)

In step S250, based on the alignment result obtained in step S230, the image generation unit 140 generates a new image (deformed image) by performing coordinate transformation on the first image so that the first image coincides with the second embodiment.

(Step S260; Obtainment of Estimation Error)

In step S260, based on the alignment results (difference between the first deformation information and the second deformation information) obtained in steps S230 and S240, the estimation error obtaining unit 150 calculates the estimation error or reliability of alignment at each point on the deformed image obtained in step S250, and generates an estimation error image representing the distribution. The estimation error obtaining unit 150 transmits the generated estimation error image to the display control unit 160.

The estimation error image in this embodiment is a volume image in which each voxel value represents the estimation error of alignment at that position. A method of obtaining an estimation error in a voxel of interest (set at a coordinate point q) on an estimation error image will be explained below. First, the coordinate point p of the first image mapped to the coordinate point q in accordance with a map $\phi$ (first deformation information) obtained in step S230 is derived based on the map $\phi$ (that is, p satisfying $q=\phi(p)$ is obtained). Then, the coordinate point p is mapped in each map $\phi i$ (second deformation information) obtained in step S240, and a coordinate point $qi=\phi i(p)$ of the deformed image is derived. For the coordinate point p of the first image, the coordinate point q is a displacement destination based on the alignment result in step S230. In contrast, the coordinate point qi is a displacement destination based on each alignment result in step S240. Thus, the estimation error of the coordinate point q serving as the displacement destination of the coordinate point p is calculated based on the relationship between the coordinate point q and the coordinate point qi. More specifically, the estimation error of the coordinate point q is calculated based on the variation of the coordinate point qi with respect to the coordinate point q. For example, one of the average value, median value, and maximum value of the three-dimensional distance between q and each qi is defined as an estimation error. Alternatively, the distance between q and each qi along each of the x-, y-, and z-axes may be obtained to obtain an estimation error for each axis in the same way. Alternatively, the variance or standard deviation of a point group as a combination of q and qi may be obtained and used as an estimation error. Also, a value converted into 0 to 1 by performing predetermined normalization processing on the thus-obtained value may be held as reliability. The reliability is obtained based on the difference between the first deformation information and the second deformation information or the estimation error, and is an index representing how reliable each point on the deformed image is. For example, if the difference between the first deformation information and the second deformation information or the estimation error is small, the reliability is high. If the difference between the first deformation information and the second deformation information or the estimation error is large, the reliability is low.

The above-described processing is executed for predetermined voxels on the deformed image, generating an estimation error image. Note that the region where the estimation error is calculated may be the entire deformed image (all voxels), or be an organ region of interest or a region of interest such as a lesion. In the latter case, information of the organ region or the region of interest obtained from the data server 20 in step S200 is referred to. Alternatively, the organ region or the region of interest is obtained using image threshold processing or an existing region extraction method. Alternatively, a region on an image that is designated by the user is obtained as a region of interest. Then, a point in the region is set as a point of interest, and the estimation error is obtained for each point of interest. In this case, calculation unnecessary for subsequent processing can be omitted. The point of interest may be all voxels within the region or be set at every predetermined interval (for example, every sixth voxel). This can shorten the estimation error calculation time.

(Step S270; Display of Cross-section Image and Estimation Error)

In step S270, the display control unit 160 performs control to display, on the display 30 in accordance with a user operation, the cross-section image of the second image, and a corresponding cross-section image of the deformed image generated in step S250. The display control unit 160 also performs control to extract a cross-section corresponding to the cross-section image of the deformed image from the estimation error image obtained in step S260, and display the cross-section as an estimation error map on the display 30.

FIG. 3A shows an example of a cross-section image 310 of a deformed image displayed on the display 30. FIG. 3B shows an example of the display of an estimation error map displayed on the display 30. In this example, an estimation error map 320 is displayed to overlap the cross-section image 310 of the deformed image. The estimation error map 320 displayed here is a cross-section image obtained by cutting the estimation error image (volume data) obtained in step S260 along a cross-section corresponding to the cross-section image 310 of the deformed image. The luminance value of the image is a value obtained by converting the voxel value of the estimation error map. For example, a grayscale estimation error map is created by converting a predetermined estimation error (for example, an estimation error of 10 mm) into a luminance value of 255 and an estimation error of 0 mm into a luminance value of 0. A pseudo-color is assigned to this estimation error map, and the estimation error map is displayed as a pseudo-color map.

Note that the estimation error map may be displayed beside the cross-section image or displayed to overlap the cross-section image. ON/OFF of the overlapping display can be controlled by turning on/off, by the user, an overlapping display button on a GUI (not shown) displayed on the display 30. When this button is OFF, the estimation error map is hidden and only the cross-section image 310 is displayed. When this button is ON, the estimation error map 320 and the cross-section image 310 are displayed to overlap each other. When estimation errors in the respective axis directions are obtained in step S260, the respective estimation error maps may be displayed side by side, or the user may select an axis direction in which an estimation error map is to be displayed.

Note that the estimation error map displayed in this step may be generated by performing predetermined processing on an estimation error image. For example, red or the like may be semi-transparently displayed to overlap a voxel in which the estimation error is equal to or larger than a threshold, so that the user can more explicitly confirm a portion having a large estimation error. As a matter of course, it is desirable that the user can select an estimation error map to be displayed by overlapping.

As described above, the image processing apparatus (image processing apparatus 10) according to this embodiment includes the first estimation unit (alignment unit 130, S230) configured to estimate a deformation between the first image and the second image under the first condition and obtain the first deformation information, the second estimation unit (alignment unit 130, S240) configured to estimate a deformation between the first image and the second image under the second condition different from the first condition and obtain the second deformation information, and the obtaining unit (estimation error obtaining unit 150, S260) configured to obtain the estimation error or reliability of the deformation at a point on an image based on the difference between the first deformation information and the second deformation information.

According to this embodiment, the estimation error or reliability of a deformation can be obtained. Since an estimation error map is displayed to overlap the cross-section image of a deformed image, the user can easily grasp the reliability of a position (how reliable the position is) at which each point of the displayed cross-section image may exist.

(Modification 1)

Generation of an estimation error image as a volume image in step S260 is not always indispensable. Instead, the obtainment of an estimation error may be performed for only each voxel on the cross-section image of a deformed image decided to be displayed by processing in step S270, and the cross-section image of the estimation error to be displayed may be directly generated.

(Modification 2)

The obtainment of pieces of corresponding information that is executed by the corresponding information obtaining unit 120 in step S210 may be automatically performed by image analysis processing. For example, characteristic points and lines of image patterns may be detected from respective images, and pieces of corresponding information may be automatically obtained based on the similarity between the image patterns. Alternatively, a corresponding point automatically obtained by image analysis processing may be set as a candidate, and a point manually corrected by the user may be set as the position of a final corresponding point. Note that the obtainment of pieces of corresponding information may be performed by loading information held in the data server 20.

(Modification 3)

The method of varying the estimation method (estimation condition) in processing to be executed by the alignment unit 130 in step S240 is not limited to the above-described one. For example, different deformation estimation results may also be obtained by using a plurality of different deformation description models. For example, when executing deformation estimation using FFD in step S230, deformation estimation using a radial basis function may be performed in this step.

Second Embodiment

The first embodiment has explained an example in which an estimation error map that visualizes the distribution of an estimation error is displayed to overlap the cross-section image of a deformed image. To the contrary, an image processing apparatus according to the second embodiment has a feature in which an estimation error is displayed in a form other than a map. As for the image processing apparatus according to the second embodiment, only a difference from the first embodiment will be explained below.

The arrangement of an image processing system 1, the operation of each unit of an image processing apparatus 10, and the processing procedures in the second embodiment are almost the same as those in the first embodiment. However, the second embodiment is different from the first embodiment in only processing to be performed by a display control unit 160 in step S270.

(Step S270; Display of Cross-Section Image and Estimation Error)

In step S270, the display control unit 160 performs control to display, on a display 30 in accordance with a user operation, the cross-section image of the second image, and a corresponding cross-section image of a deformed image generated in step S250. The display control unit 160 also performs control to obtain, from an estimation error image obtained in step S260, the estimation error of a point designated by the user on the cross-section image of the deformed image, and display the estimation error on the display 30.

FIGS. 4A and 4B show an example of the display of an estimation error according to this embodiment. When the display control unit 160 obtains designation, by a mouse or the like, of a coordinate point on a cross-section image 310 of a deformed image displayed on the display 30, it obtains an estimation error at this coordinate point from an estimation error image. Then, for example, as shown in FIG. 4A, the display control unit 160 displays text information 420, which represents the estimation error at this coordinate point, at a coordinate point indicated by a cursor 410 to overlap the cross-section image 310 near the cursor 410. Alternatively, as shown in FIG. 4B, the display control unit 160 displays, at a coordinate point indicated by a cursor 430, an ellipse representing a distribution (estimation error range) 440 on the cross-section image of the estimation error at this coordinate point. By moving the cursor on the displayed cross-section image 310, the user can grasp an error estimation value at this coordinate point.

In this manner, according to the first embodiment, an estimation error map that visualizes the distribution of an estimation error is displayed to overlap the cross-section image of a deformed image. According to the second embodiment, text information or an error estimation range representing an estimation error is displayed at a coordinate point indicated by a cursor on the cross-section image of a deformed image. However, the method of obtaining deformation information and the method of obtaining an estimation error or reliability are not limited to the methods described in the first embodiment, and various methods are usable. It suffices that a deformed image and an estimation error or reliability are displayed in association with each other so that the user can grasp the reliability of a position (how reliable the position is) at which each point of a displayed cross-section image may exist.

As described above, the image processing apparatus (image processing apparatus 10) according to each of the first and second embodiments includes the information obtaining unit (for example, corresponding information obtaining unit 120 and alignment unit 130) configured to obtain deformation information of an image, the image generation unit (image generation unit 140) configured to generate a deformed image by performing coordinate transformation on the image based on the deformation information, the obtaining unit (estimation error obtaining unit 150) configured to obtain the estimation error or reliability of a deformation on the deformed image, and the display control unit (display control unit 160) configured to display (for example, by overlapping) the deformed image and information (for example, estimation error map 320 in the first embodiment, or the text information 420 or the ellipse indicating the estimation error range 440 in the second embodiment) representing the estimation error or reliability in association with each other.

According to these embodiments, the estimation error or reliability of a deformation can be presented by a display method other than a map, avoiding a disadvantage in which overlapping of an estimation error map or the like makes it hard to see a cross-section image.

According to the present invention, the estimation error or reliability in alignment between a plurality of images can be obtained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-123815, filed Jun. 16, 2014, which is hereby incorporated by reference herein in its entirety.

What is claimed is:
1. An image processing apparatus comprising:
a first estimation unit configured to estimate a deformation between a first image and a second image under a first condition and obtain first deformation information;
a second estimation unit configured to estimate a deformation between the first image and the second image under a second condition different from the first condition and obtain second deformation information; and
an obtaining unit configured to obtain one of an estimation error and reliability of the deformation at a point on an image based on a difference between the first deformation information and the second deformation information.

2. The apparatus according to claim 1, further comprising a setting unit configured to set the second condition based on the first condition.

3. The apparatus according to claim 2, wherein said setting unit is configured to set the second condition by changing at least part of the first condition.

4. The apparatus according to claim 3, wherein the first condition includes a type of a deformation description model used when estimating a deformation, and detailed settings of the deformation description model.

5. The apparatus according to claim 4, wherein said setting unit sets the second condition by changing some of the detailed settings of the deformation description model of the first condition.

6. The apparatus according to claim 1, further comprising an image generation unit configured to generate a deformed image by performing coordinate transformation on the first image so as to coincide with the second image based on the first deformation information.

7. The apparatus according to claim 6, further comprising a display control unit configured to perform control to display, on a display, a cross-section image of the second image and a corresponding cross-section image of the deformed image generated by said image generation unit.

8. The apparatus according to claim 7, wherein said obtaining unit is configured to generate an estimation error image representing a distribution of the estimation error.

9. The apparatus according to claim 8, wherein said display control unit is configured to perform control to extract a cross-section corresponding to the cross-section image of the deformed image from the estimation error image and display the cross-section as an estimation error map on the display to overlap the cross-section image of the deformed image.

10. An image processing apparatus comprising:
an information obtaining unit configured to obtain deformation information of an image;
an image generation unit configured to generate a deformed image by performing coordinate transformation on the image based on the deformation information;
an obtaining unit configured to obtain one of an estimation error and reliability of a deformation on the deformed image; and
a display control unit configured to display, on a display, the deformed image and information representing one of the estimation error and reliability in association with each other.

11. An image processing method comprising the steps of:
estimating a deformation between a first image and a second image under a first condition to obtain first deformation information;
estimating a deformation between the first image and the second image under a second condition different from the first condition to obtain second deformation information; and
obtaining one of an estimation error and reliability of the deformation at a point on an image based on a difference between the first deformation information and the second deformation information.

12. An image processing method comprising the steps of:
obtaining deformation information of an image;
generating a deformed image by performing coordinate transformation on the image based on the deformation information;
obtaining one of an estimation error and reliability of a deformation on the deformed image; and
displaying the deformed image and information representing one of the estimation error and reliability in association with each other.

13. An image processing apparatus comprising:
an image generation unit configured to generate a deformed image by performing coordinate transformation on an image;
an obtaining unit configured to obtain information on reliability of a deformation on the deformed image; and
a display control unit configured to display, on a display, the deformed image and the information on the reliability in association with each other.

14. The apparatus according to claim 13, wherein said display control unit is configured to display, on the display, the deformed image and the information on the reliability so that the information of the reliability is displayed beside the deformed image.

15. The apparatus according to claim 13, wherein said display control unit is configured to display, on the display, the deformed image and the information on the reliability so that the information of the reliability is displayed to overlap the deformed image.

16. The apparatus according to claim 13, wherein said display control unit is configured to receive information on a position designed on the deformed image which is displayed, and
display, on the display, the deformed image and the information on the reliability of the position based on the information on the position.

17. The apparatus according to claim 16, wherein said display control unit is configured to display, on the display, the deformed image and a text on the reliability of the position based on the information on the position, as the information on the reliability.

18. The apparatus according to claim 13, said obtaining unit is configured to obtain a map representing deformations of positions on the deformed image, as the information on the reliability of the deformation on the deformed image, and
said display control unit is configured to display, on the display, the deformed image and the map as the information on the reliability.

19. The apparatus according to claim 15, said display control unit is configured to turn ON or Off of overlapping display of the information on the reliability based on a designation of an user.

20. An image processing method comprising the steps of:
generating a deformed image by performing coordinate transformation on an image;
obtaining information on reliability of a deformation on the deformed image; and
displaying the deformed image and the information on reliability in association with each other.

* * * * *